July 19, 1938.　　　R. J. CAUGHEY　　　2,124,395
POWER PLANT
Filed Aug. 31, 1934
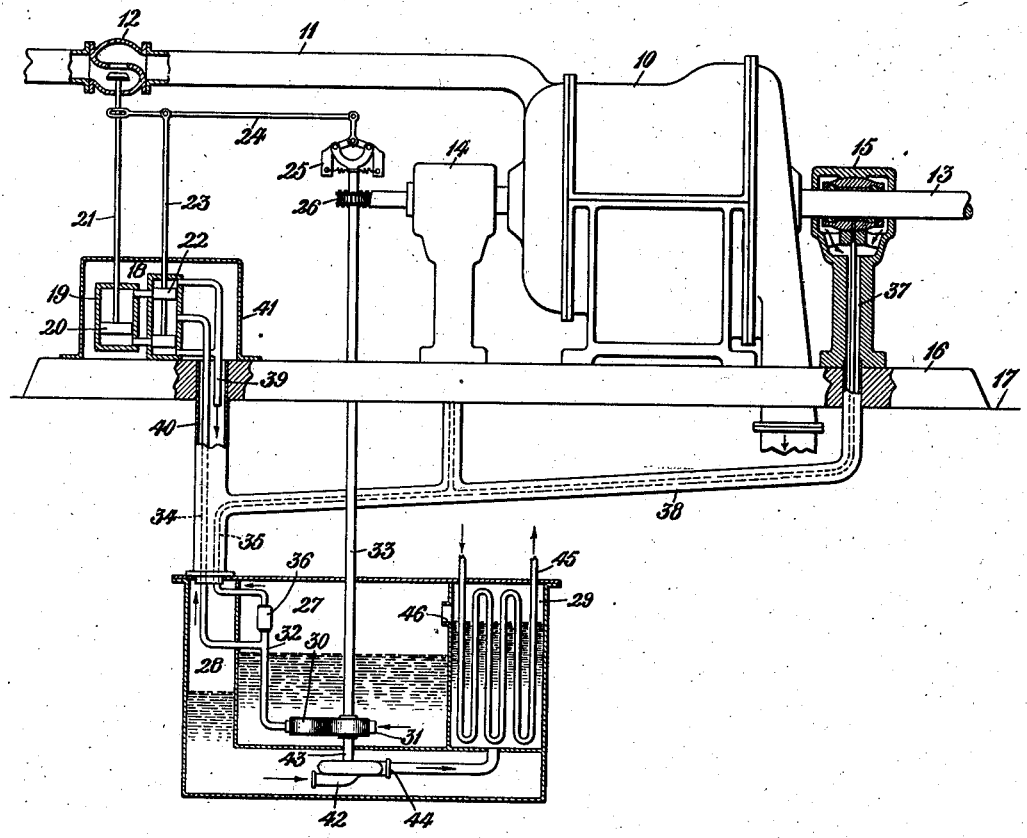
Inventor:
Reed J. Caughey,
by Harry E. Dunham
His Attorney.

Patented July 19, 1938

2,124,395

UNITED STATES PATENT OFFICE 2,124,395

POWER PLANT

Reed J. Caughey, Schenectady, N. Y., assignor to General Electric Company, a corporation of New York Application August 31, 1934, Serial No. 742,253

5 Claims. (Cl. 253—39)

The present invention relates to power plants comprising elastic fluid engines having rotatable shafts supported by bearings and including valve means or like elements for controlling the admission of elastic fluid to the engines and a hydraulic motor for controlling the valve means. In these arrangements a system is provided for supplying oil or like lubricant to the bearings and oil or like actuating fluid to the hydraulic motor for operating the valve means. The invention relates more specifically to the kind of arrangements in which oil or like lubricant or actuating fluid is supplied from a source to the bearing and the motor respectively at high pressure and returned at lower pressure.

The object of the invention is to provide an improved system for conducting oil or like fluid to bearings and motors or like elements in the above type of power plants in order to minimize the danger of oil coming into contact with hot parts or elements of such elastic fluid engines, and becoming ignited.

This is accomplished in accordance with my invention by the provision of a system in which the supply pipes or conduits for conducting oil or like inflammable liquid under comparatively high pressure to the bearings and hydraulic motor are disposed within the pipes or conduits for returning or draining the oil or like inflammable substance from the bearings and motors.

For a better understanding of what I believe to be novel and my invention, attention is directed to the following description and the claims appended thereto in connection with the accompanying drawing.

The single figure of the drawing illustrates a power plant with an oil supply system embodying my invention.

The power plant illustrated in the drawing comprises an elastic fluid turbine 10 having an inlet conduit 11 including a valve means 12 for controlling the admission of elastic fluid to the turbine. A rotatable shaft 13 of the turbine is supported by bearings 14 and 15 resting on a turbine base 16, which latter is secured to a foundation 17. The valve means 12 is regulated by means of an hydraulic motor 18, including a cylinder 19 with a piston 20 having a stem 21 connected to the valve means and a pilot valve 22 having a stem 23. The stem 21 of the piston 20 and the stem 23 of the pilot valve are connected to a floating lever 24 which is linked to a speed governor 25 driven from the turbine shaft 13 by a worm gear 26. This is a well known type of speed control mechanism for regulating the valve means 12 in response to speed changes, more specifically for opening the valve means 12 in response to a drop in speed and closing the valve means 12 in response to a rise in speed.

The power plant includes a system for supplying lubricant to the bearings 14 and 15 and actuating fluid to the hydraulic motor. In the usual type of arrangement, oil is used as lubricant as well as actuating fluid for the bearings and the motor respectively. As oil is an inflammable substance which has an ignition temperature below the temperature of the turbine casing and other elements heated during operation, I arrange the oil supply system so that the danger of oil coming into contact with heated elements of the turbine is considerably minimized.

The system comprises a fireproof tank disposed in a fireproof space below the level of the turbine base and forming three compartments 27, 28 and 29. An oil supply pump 30 having an inlet 31 and an outlet 32 is disposed within the compartment 27. The pump 30 is driven by a shaft 33 which forms in substance a continuation of the governor shaft. The discharge conduit 32 of the pump is branched, a branch or branch conduit 34 being connected to the pilot valve 22 for supplying oil under pressure to the hydraulic motor and a branch or branch conduit 35 being connected to the bearings 14 and 15 for supplying oil under pressure thereto. The branch 35 includes a pressure reducing means 36 for reducing the pump pressure to the pressure desired in the bearings. For example, the arrangement may be such that the pump delivers oil at a pressure of 125 pounds per square inch which is the pressure necessary for operating the hydraulic motor. This pressure of 125 pounds may be reduced to a pressure of the order of 25 pounds by the pressure reducing means 36, at which pressure lubricant is supplied to the bearings. The branch conduit 35 has an end portion disposed within a channel 37 in the bearing pedestal and connected to a central portion of the bearing surface. Lubricant is returned from the ends of the bearing 15 through a return conduit comprising said channel 37 and a conduit 38 connected to the compartment 28. As will be readily seen, the supply conduit 35 is disposed within the return conduit 38. This is an important feature of my invention in that it minimizes to a considerable extent fire hazard in power plants. Oil leaking from the supply conduit 35 is collected in the return conduit 38 and returned to the compartment 28. The possibility of leakage is much greater with respect to the supply conduit than with respect to the return conduit in view of the considerably higher pressure in the supply conduit.

The enclosing of the supply conduit within the drain conduit is important with respect to those conduit portions which are located in proximity to the turbine, that is, at such distance from highly heated turbine parts that an oil jet occurring as the result of a leak in the supply conduit might reach such highly heated turbine portions and become ignited were it not for the drain conduit surrounding the supply conduit.

As stated before, oil is supplied to the hydraulic motor by the branch conduit 34. Oil is drained from the hydraulic motor by a drain conduit 39. The branch conduit 34 and a portion of the conduit 39 are disposed within a fireproof channel 40 connected to the compartment 28. This channel 40 together with the conduit 39 serves to return oil from the hydraulic motor to the compartment 28 and also for protecting the plant against fire in case the supply conduit 34 becomes leaky. The upper portions of the conduits 34 and 39, as well as the hydraulic motor, are enclosed by a fireproof casing 41 disposed adjacent to the turbine but out of reach of turbine elements subject to high temperature during operation. The oil returned to the compartment 28 is pumped into the compartment 29 by means of a pump 42 driven by an extension 43 of the shaft 33 and having an outlet 44 connected to the compartment 29. The oil in compartment 29 is cooled by cooling means 45 and returned to the compartment 27 through an overflow 46. During operation, a continuous flow or circulation of oil takes place from the compartment 27 through the bearings, and oil or actuating fluid is at times supplied to the hydraulic motor and at other times drained therefrom in response to speed changes. The possibility of leakage oil coming in contact with heated machine elements and becoming ignited is substantially eliminated, first, by enclosing the hydraulic motor and its pilot valve in a fireproof casing disposed adjacent the vertical projection of the engine; second, by arranging the oil supply and return conduits so that oil leaking therefrom does not drop onto a heated machine element, or from another viewpoint by keeping the space vertically above the heated machine elements free from oil conduits, the source of oil 8, the supply and return conduits being preferably provided at a level below the level of heated machine elements; and third, by disposing the supply conduits for conducting oil under high pressure substantially within the oil return or drain conduits for returning oil at lower pressure. The last mentioned feature, namely, the enclosing of the oil supply conduits by the oil drain or return conduits, has another important advantage. It reduces to some extent the necessary space for placing these conduits and what is more important, it reduces the cost of the oil supply and drain system because it eliminates the necessity of providing special protecting means for joints of the oil supply conduits. Whenever the source of oil, as in the present instance, is arranged at a remote point from the elements, such as bearings and hydraulic motors to which oil is to be supplied, the oil supply and drain conduits are made up from a number of sections flanged or otherwise suitably joined together. Heretofore special protecting means had to be provided, in particular with regard to the oil supply conduits, in which the pressure is much higher than in the drain conduits, in order to prevent leakage of oil through said joints. Now with the oil supply conduits displaced within the oil drain or return conduits, the necessity for providing such special protection with regard to the joints of the oil supply conduits is completely eliminated.

What I claim as new and desire to secure by Letters Patent of the United States, is:—

1. The combination with an elastic fluid turbine for operation with high temperature elastic fluid and an element associated with the turbine and requiring inflammable liquid under pressure, of a system for supplying such inflammable liquid to the element, said system including a supply conduit for conducting the inflammable liquid at high pressure to the element and a drain conduit for conducting the inflammable liquid at low pressure from the element, at least a portion of the supply conduit being in proximity to highly heated turbine parts and enclosed by the drain conduit.

2. The combination with an elastic fluid turbine for operation with a high temperature elastic fluid and an element associated with the turbine and requiring oil under pressure, of an oil supply and return piping system located for a considerable part of its length in proximity to highly heated parts of said turbine, the oil supply piping being located inside of and being protected by the oil return piping at the points where such proximity exists.

3. The combination with an elastic fluid turbine for operation with a high temperature elastic fluid and an element associated with the turbine and requiring oil under pressure, of an oil supply and return piping system located for a considerable part of its length in proximity to highly heated parts of said turbine, the oil supply piping being located inside of and being protected by the oil return piping at the points where such proximity exists, said piping system being located outside the space above the vertical projection of the turbine.

4. The combination with an elastic fluid turbine for operation with high temperature elastic fluid and a bearing for supporting the turbine shaft of an oil supply system for said bearing, said system including oil supply and oil drain conduits for conducting oil under pressure to said bearing and draining oil by gravity from said bearing, at least a portion of said supply conduit being in proximity to highly heated turbine parts and completely enclosed within said drain conduit.

5. The combination with an elastic fluid turbine for operation with high temperature elastic fluid and a hydraulic motor forming a part of a control mechanism associated with the turbine, of an oil supply system for said hydraulic motor, said system including oil supply and oil drain conduits for conducting oil under pressure to said hydraulic motor and draining oil by gravity from said hydraulic motor, at least a portion of said supply conduit being in proximity to highly heated turbine parts and completely enclosed within said drain conduit.

REED J. CAUGHEY.